United States Patent Office 3,251,810
Patented May 17, 1966

3,251,810
COPOLYMERIZATION OF VINYL CHLORIDE WITH A CATALYST CONSISTING OF ALUMINUM TRIALKYL, A BORIC ACID ESTER AND A COCATALYST
Robert Büning, Cologne, Germany, assignor to Dynamit Nobel A.G., Troisdorf, Germany, a corporation of Germany
No Drawing. Filed Nov. 13, 1961, Ser. No. 152,062
9 Claims. (Cl. 260—78.5)

The present invention relates to a process for the polymerization of vinyl chloride in the presence of at least one other unsaturated polymerizable monomer and more particularly to such a process wherein the polymerization is carried out in the presence of a catalyst mixture of an organo-aluminum compound and a boric acid ester, and possibly a suitable oxidizing agent as cocatalyst. As instances of suitable cocatalysts, nitrogen tetroxide, sulfur, halogens, and other like compounds are intended.

In the copending United States application Serial No. 140,208, filed September 25, 1961, and now U. S. Patent 3,167,534, an improved process for the polymerization of vinyl chloride is disclosed which comprises effecting the polymerization of vinyl chloride in the presence of a catalyst mixture of an organo-aluminum compound together with a boric acid ester and preferably in the additional presence of, as a cocatalyst, an oxidation agent selected from the group of halogen, sulfur, nitrogen tetroxide and similar compounds.

It has been found, in accordance with the present invention, that an efficient polymerization of vinyl chloride may be carried out in the additional presence of unsaturated polymerizable compounds. The unsaturated polymerizable compounds or monomers which may be used in accordance with the present invention include: vinyl acetate, maleic acid diester, ethylene, propylene, vinylidene chloride, allyl chloride, dichloroethylene, vinyl stearate, ethylene trichloride, acrylonitrile, and many others, as well as mixtures of the said monomeric compounds.

The use of additional monomers is particularly advantageous by reasons of the possibilities afforded to regulate to a desirable extent the properties of the vinyl chloride polymerizates obtained. In addition to the advantages associated with the copolymerization, the invention affords the possibilities and the advantages associated therewith of regulating and specifically of lowering the K-value of the vinyl chloride polymerization products obtained through the addition of halogen-containing monomers, such as transdichloroethylene or like substances to the polymerization mixture. As a result of the reduction in the K-value, the workability of the vinylchloride polymerizates recovered is facilitated. The lowering of the K-value obtained in accordance with the invention is based on otherwise identical reactions.

The polymerization of vinyl chloride effected in the presence of vinyl acetate results in the formation of copolymers which possess as compared with the homopolymers at only a slightly modified deformation-tendency much improved mechanical properties. The percentage of vinyl acetate in the copolymer thereby obtained may amount to less than 2%.

It is also possible in accordance with the invention to carry out the polymerization of the vinyl chloride in the presence of more than one monomer.

The organo-aluminum compound which may be used in accordance with the present invention may include any aluminum trialkyl, such as the trimethyl, triethyl, tripropyl, tributyl, triisobutyl, and the like, while the boric acid ester may be a boric acid trialkyl ester such as the trimethyl ester, triethyl ester, tripropyl ester, tributyl ester, triisobutyl ester, triallyl ester, triisooctyl ester and the mixtures thereof; the catalyst mixture may be present in a solvent such as one of the group of aliphatic hydrocarbons, aromatic hydrocarbons, normal ethers, and cyclic ethers, such as, for example, tetrahydrofurane and dioxane. The catalyst mixture may be suitably prepared by combining the organo-aluminum compound and boric acid ester under heating and with the exclusion of moisture and oxygen.

The adding of the cocatalyst in accordance with the invention may take place by adding the cocatalyst to the vinyl chloride monomer before the addition of the catalyst mixture of organo-aluminum compound and boric acid ester and before the addition of the additional monomer. Alternatively, a direct addition of the cocatalyst to the catalyst mixture before the polymerization is also possible, as well as the combination of the cocathalyst with either of the components of the catalyst mixture, i.e. the organo-aluminum compound or the boric acid ester, prior to the combining with the remaining components of such mixture.

The following examples are set forth for the purpose of illustrating the present invention, and it is to be understood that the invention is not to be limited thereto:

*Example 1*

25 kg. of well dried vinyl chloride are introduced into a 40 liter reaction vessel constructed of V2A-steel, provided with a T-stirrer, and therein are cooled to −15 degrees C. and treated with 750 g. of vinyl acetate. Stirring is initiated with the stirrer operating at 50 revolutions per minute. There are then introduced into the reaction vessel 2.4 g. of bromine and the catalyst mixture. The catalyst is prepared as follows:

120 g. aluminum triethyl are dissolved in 1000 cc. absolute tetrahydrofurane, treated with 240 g. of boric acid trimethyl ester under exclusion of oxygen. After the exothermic reaction of the mixture has ceased, the catalyst mixture is heated for 15 minutes under reflux.

The polymerization reaction using the so-prepared catalyst is interrupted after 3 hours and the monomer, together with the unconsumed catalyst, separated from the polymer formed by centrifuging. The polymer is washed with liquid vinyl chloride and then dried. A yield of 5.4 kg. of polymerizate is obtained in this manner having the following characteristics:

K-value (measured in cyclohexanone) _____ 84.5
Percent Chlorine _____ 55.6
Tensile strength (kg. cm.$^{-2}$) _____ 670
Elasticity (percent) _____ 24
Vicat (0 degree C.) (5 kg. load) _____ 106

When the foregoing polymerization is repeated but without the addition of vinyl acetate, then the polymerizate obtained has the following characteristics:

K-value (measured in cyclohexanone) _____ 85.0
Percent chlorine _____ 56.6
Tensile strength (kg. cm.$^{-2}$) _____ 555
Elasticity (percent) _____ 4
Vicat (0 degree C.) (5 kg. load) _____ 111

Example 2

The procedure of Example 1 is repeated but in this instance in addition to vinyl acetate, there are used 120 g trichloro ethylene as starting monomer. There are obtained 5.3 kg. of a polymerizate which differs from the polymerizates recovered in Example 1 by a reduced K-value of 71.5.

Example 3

1.0 g. aluminum tributyl, 2.5 g. boric acid trimethyl ester and 15 cc. absolute tetrahydrofurane are heated under nitrogen for 15 minutes to 55 degrees C. This reaction mixture is introduced under exclusion of oxygen into a 550 cc. pressure autoclave (100 atmospheres excess pressure).

200 g. vinyl chloride, in which 15 mg. iodine have been dissolved, are thereupon introduced into the autoclave. Immediately thereafter the autoclave is filled with ethylene of 60 atmospheres excess pressure and the autoclave is shaken. The pressure within the autoclave drops within a very short time to 40 atmospheres excess pressure and ethylene is introduced until a pressure of 60 atmospheres excess pressure is again attained. This procedure is repeated three more times, until the pressure drops only very slowly. The autoclave is thereupon shaken at room temperature overnight. After polymerization is complete, the pressure has dropped to 20 atmospheres excess pressure and after the working up of the polymerization mixture with methanol-hydrogen chloride and washing and drying, there are obtained 43 g. of a polymerizate having a chlorine-content of 49.6% as against a 56.7% chlorine content for pure polyvinyl chloride. The K-value of the polymerizate thus obtained is 60.5 IR-spectroscopic establishes the presence of methylene groups which are adjacent to a C-atom without chlorine substitution in the polymerizate. The polymerizate thus obtained is therefore established to be a copolymer of vinyl chloride with ethylene.

Example 4

In a glass vessel (500 cc. with stirrer) 200 g. vinyl chloride are cooled to −20 degrees C. and treated with 10 g. maleic acid diethyl ester and 30 mg. $N_2O_4$ in 10 cc. absolute petroleum ether. While stirring the ingredients and excluding oxygen, the catalyst used is added. The catalyst is prepared as described in Example 1 from 1.50 g. aluminum triethyl, 15 cc. absolute tetrahydrofurane and 2.8 g. boric trimethyl ester.

After a polymerization time of 4 hours, the polymerization is interrupted by addition of methanol-hydrogen chloride (2:1). The polymerizate formed is separated from the liquid contents of the reaction vessel by filtering, thereafter washed with water and then with methanol and dried at 60 degrees C. A yield of 38.4 g. polymerizate having a chlorine content of 55.1% and a K-value of 82.3 is obtained. By means of IR spectroscopic analysis, there may be established in the polymerizate ester bands.

Example 5

Example 4 is repeated, but in addition to the monomer therein recited 1.5 g. of transdichloroethylene is additionally used. As compared to the polymerizate obtained in Example 4, the polymerizate in this instance has a K-value decreased to 69.5.

If, in place of the 1.5 g. transdichloro-ethylene, there is used as monomer, 3.0 g. allylchloride, then the polymerizate recovered has a K-value of 64.0.

Example 6

Example 4 is repeated, but in place of 5 g. of vinyl acetate, 10 g. of acrylonitrile are used. The polymerization is completed in 10 hours and there are obtained after this time 41 g. of a polymerizate having a nitrogen content of 2.1%.

Example 7

In a suitable 1-liter glass reaction vessel, 650 g. vinyl chloride are condensed at −25 degrees C. To the condensate thusly obtained, there are added 65 g. vinylidene chloride and a catalyst prepared as follows:

6.0 g. aluminum triethyl are dissolved under exclusion of air in 75 cc. absolute tetrahydrofurane. This solution is treated with 30 mg. of sulfur and stirred at room temperature until all of the sulfur has gone into solution. This reaction mixture is heated with 12.5 g. boric acid trimethyl ester while stirring for 15 minutes under reflux.

After a polymerization time of 6 hours, the polymerizate formed is separated by filtering, thereafter washed with vinylidene chloride and then with methanol. After drying, a yield of 126 g. of a polymerizate having a chlorine content of 59.5% is obtained.

For the determination of the K-value see: H. Fikentscher, Cellulosechemie 13, 60 (1932).

What is claimed is:

1. A process for the copolymerization of vinyl chloride and a polymerizable unsaturated monomer, which comprises polymerizing vinyl chloride and a polymerizable unsaturated monomer selected from the group consisting of vinyl acetate, maleic acid diester, ethylene, propylene, vinylidene chloride, allyl chloride, dichloroethylene, vinyl stearate, ethylene trichloride, acrylonitrile and mixtures thereof, in the presence of a catalyst mixture of an aluminum trialkyl and a member selected from the group consisting of saturated and unsaturated aliphatic boric acid esters and a cocatalyst selected from the group consisting of sulfur, nitrogen tetroxide and halogen, and recovering the polymerizate formed from the reaction mixture.

2. A process for the copolymerization of vinyl chloride and vinyl acetate which comprises effecting the polymerization of vinyl chloride and vinyl acetate in the presence of a catalyst mixture of aluminum triethyl, and boric acid trimethyl ester, and as cocatalyst bromine and recovering the polymerizate formed from the reaction product.

3. A process for the copolymerization of vinyl chloride, vinyl acetate, and trichloroethylene, which comprises effecting the polymerization in the presence of a catalyst mixture of aluminum triethyl and boric acid trimethyl ester and as cocatalyst bromine and recovering the polymerizate formed from the reaction product.

4. A process for the copolymerization of vinyl chloride and ethylene which comprises effecting the polymerization in the presence of a catalyst mixture of aluminum tributyl and boric acid trimethyl ester and as cocatalyst iodine and recovering the polymerizate formed from the reaction product.

5. A process for the copolymerization of vinyl chloride and maleic acid diethyl ester which comprises effecting the polymerization in the presence of a catalyst mixture of aluminum triethyl and boric acid trimethyl ester and as cocatalyst $N_2O_4$ and recovering the polymerizate formed from the reaction product.

6. A process for the copolymerization of vinyl chloride, maleic acid diethyl ester, and transdichloroethylene which comprises effecting the polymerization in the presence of a catalyst mixture of aluminum triethyl and boric acid trimethyl ester and as cocatalyst $N_2O_4$ and recovering the polymerizate formed from the reaction product.

7. A process for the copolymerization of vinyl chloride, maleic acid diethyl ester, and allyl chloride which comprises effecting the polymerization in the presence of a catalyst mixture of aluminum triethyl and boric acid trimethyl ester and as cocatalyst $N_2O_4$ and recovering the polymerizate formed from the reaction product.

8. A process for the copolymerization of vinyl chloride and acrylonitrile which comprises effecting the polymerization in the presence of a catalyst mixture of aluminum triethyl and boric acid trimethyl ester and as cocatalyst $N_2O_4$ and recovering the polymerizate formed from the reaction product.

9. A process for the copolymerization of vinyl chloride and vinylidene chloride which comprises effecting the polymerization in the presence of a catalyst mixture of aluminum triethyl and boric acid trimethyl ester and as cocatalyst sulfur and recovering the polymerizate formed from the reaction product.

References Cited by the Examiner

UNITED STATES PATENTS

| | | | |
|---|---|---|---|
| 2,391,218 | 12/1945 | Bacon et al. | 260—87.5 |
| 2,497,291 | 2/1950 | Brubaker et al. | 260—87.5 |
| 2,846,427 | 8/1958 | Findlay | 260—94.9 |

FOREIGN PATENTS

| | | |
|---|---|---|
| 467,383 | 8/1950 | Canada. |
| 783,837 | 10/1957 | Great Britain. |

OTHER REFERENCES

Ashikari: J. Poly. Sci. 28, pp. 28, 641–2, 1958.

Kawai et al.: J. Chem. Soc. Japan 80, pp. 776–9, 1959 (see Chem. Abs., vol. 55, p. 3111g–i).

Vinyl and Related Polymers by Schildknecht, John Wiley & Sons, Inc., N.Y., April 1958, p. 398 to p. 410 relied on.

JOSEPH L. SCHOFER, *Primary Examiner.*

JOSEPH R. LIBERMAN, *Examiner.*

L. WOLF, *Assistant Examiner.*